US008862792B2

(12) United States Patent
Hess et al.

(10) Patent No.: US 8,862,792 B2
(45) Date of Patent: Oct. 14, 2014

(54) RETRIEVING STATUS INFORMATION FROM A REMOTE DEVICE AND CORRESPONDING HOST SYSTEM

(75) Inventors: Thomas Hess, Bad Liebenzell (DE);
Philip S. Schulz, Boeblingen (DE);
Markus Strasser, Metzingen (DE);
Sven Wagner, Tiefenbronn (DE);
Constantin Werner, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/524,152

(22) Filed: Jun. 15, 2012

(65) Prior Publication Data

US 2012/0331183 A1 Dec. 27, 2012

(30) Foreign Application Priority Data

Jun. 22, 2011 (EP) .................................... 11170888

(51) Int. Cl.
*G06F 3/00* (2006.01)
*G06F 13/14* (2006.01)
*G06F 13/00* (2006.01)
*G06F 13/40* (2006.01)

(52) U.S. Cl.
CPC ............... *G06F 13/00* (2013.01); *G06F 13/40* (2013.01)
USPC ............................................ 710/19; 710/305

(58) Field of Classification Search
CPC .... G06F 1/263; G06F 1/3215; G06F 13/4068
See application file for complete search history.

(56) References Cited

U.S. PATENT DOCUMENTS

| 4,630,314 | A | * | 12/1986 | Smith | ............................ 455/505 |
|---|---|---|---|---|---|
| 2002/0057134 | A1 | | 5/2002 | Kondo | |
| 2002/0169915 | A1 | | 11/2002 | Wu | |
| 2004/0151201 | A1 | | 8/2004 | Dandy et al. | |
| 2006/0095629 | A1 | | 5/2006 | Gower et al. | |
| 2007/0063197 | A1 | * | 3/2007 | Burkatovsky | .................... 257/49 |
| 2007/0252744 | A1 | * | 11/2007 | Takeuchi | ....................... 341/155 |
| 2008/0215765 | A1 | | 9/2008 | Butler et al. | |

FOREIGN PATENT DOCUMENTS

| EP | 0 996 067 A2 | 4/2000 |
|---|---|---|
| EP | 1 912 125 A1 | 4/2008 |
| JP | 2007-225980 A | 9/2007 |
| WO | 2008/109331 A1 | 9/2008 |
| WO | 2008146073 A1 | 12/2008 |

OTHER PUBLICATIONS

Search & Examination Report for UK Application No. GB 1209687.1, dated Sep. 28, 2012 (8 pages).

* cited by examiner

*Primary Examiner* — Hyun Nam
(74) *Attorney, Agent, or Firm* — William A. Kinnaman, Esq.; Kevin P. Radigan, Esq.; Heslin Rothenberg Farley & Mesiti P.C.

(57) ABSTRACT

Retrieval of status information from a remote device performed on a host system is provided, wherein the remote device is connected to the host system via a bus system comprising at least two signal lines terminated with resistors on the host system side and on the remote device side. The retrieval method includes: activating a sensing phase; sensing the at least two terminated signal lines during the sensing phase; and determining operating state of the remote device based on the sensing result; wherein at least a first operating state representing a connected and powered remote device is detectable.

15 Claims, 7 Drawing Sheets

RETRIEVING STATUS INFORMATION FROM A REMOTE DEVICE AND CORRESPONDING HOST SYSTEM

PRIOR FOREIGN APPLICATION

This application claims priority from European patent application number EP11170888.9, filed Jun. 22, 2011, which is hereby incorporated herein by reference in its entirety.

TECHNICAL FIELD

The present invention relates in general to the field of interconnected host computers and remote devices, and in particular to a method for retrieving status information from a remote device, and a corresponding host system retrieving status information from a remote device. Still more particularly, the present invention relates to a data processing program and a computer program product for retrieving status information from a remote device.

BACKGROUND

Computer systems typically contain many low cost peripheral chips such as e.g., sensors. These chips are often attached to the main processor through a low pin count bus such as e.g. $I^2C$. While such a low pin count bus brings the benefit of reduced overall costs, it comes at the cost of reduced functionality. Functionalities not available in the $I^2C$ protocol are the detection of presence and/or power status of a remote device.

State of the art is communication (e.g. via $I^2C$) between a host computer and remote devices connected via a bus protocol. Then the problem exists that a failure detection is needed for the communication. A prior art solution is to use an additional sense line between the host computer and the device.

As mentioned above a situation is assumed where a host computer is connected to a remote device through a low-pin count bus, e.g. $I^2C$. The host computer runs software that accesses the remote device. In this setup, the remote device can assume four states, three of which are error conditions:

Scenario a): The bus system between the host system and the remote device is disconnected.

Scenario b): The bus system between the host system and the remote device is connected, but the remote device is not supplied with power.

Scenario c): The bus system between the host system and the remote device is connected, the remote device is supplied with power but not responding, i.e. remote device is broken.

Scenario d): The bus system between the host system and the remote device is connected; the remote device is supplied with power and is responding and/or operational.

It should be noted that scenario (d) can always be detected by the fact that the remote device is responding to requests of the host system. However, depending on the protocol of the low-pin count bus, a control unit on the host system cannot distinguish between scenarios a) through c). Hence, the control unit can only detect that a remote device is working (d) or a remote device is not working. In the latter case, any of the error scenarios a) through c) could have occurred.

When a host system needs to precisely detect and distinguish between more scenarios, state-of-the art approaches shown in FIGS. 3 and 4 add another dedicated signal line as sense line SSL to the bus lines SCL, SDA.

The algorithm for the state-of-the art approach shown in FIG. 3 works as follows: The dedicated sense line SSL is pulled low on the host system side by a high impedance pull-down resistor RHS0. When a remote device is attached, the sense line SSL is pulled high by the remote device through a relatively low impedance pull-up resistor RRS1. The host system can then distinguish the scenarios a) to d) as follows:

Scenario a): The sensing signal on sense line SSL is low.
Scenario b): The sensing signal on sense line SSL is low.
Scenario c): The sensing signal on sense line SSL is high, but the remote device is not responding.
Scenario d): The sensing signal on sense line SSL is high and the remote device is responding.

However, it is still unable to distinguish between scenario a) or b).

The algorithm for the state-of-the art approach shown in FIG. 4 works as follows: The dedicated sense line SSL is pulled high on the host system side by a high impedance pull-up resistor RHS1. When a remote device is attached, the sense line SSL is pulled low by the remote device through a relatively low impedance pull-down resistor RRS0. The host system can then distinguish the scenarios a) to d) as follows:

Scenario a): The sensing signal on the sense line SSL is high.
Scenario b): The sensing signal on the sense line SSL is low, but the remote device is not responding.
Scenario c): The sensing signal on the sense line SSL is low, but the remote device is not responding.
Scenario d): The sensing signal is low and the remote device is responding.

However, it is still unable to distinguish between situation (b) or (c).

The drawback of these approaches is the additional sense line and the increased signal count resulting in higher complexity and overall system cost.

In the Patent Application Publication US 2006/0095629 A1 "SYSTEM, METHOD AND STORAGE MEDIUM FOR PROVIDING A SERVICE INTERFACE TO A MEMORY SYSTEM" by Gower et al. a cascaded interconnect system for providing a service interface to a memory system, is disclosed. The cascaded interconnect system includes a master service interface module, a service interface bus, and one or more slave service interface modules. The master service interface module and the slave interface modules are cascade interconnected via the service interface bus. Each slave service interface module is in communication with a corresponding memory module for providing a service to the memory module. An exemplary embodiment of the disclosed system includes two parallel FSI modules connected in a cascaded fashion to memory modules. The FSI modules are located on FRU service processors that are located on FSP cards. Connected to each clock wire is a ground resistor termination device, as well as a pull up resistor termination device. The ground resistor termination device, as well as the pull up resistor termination device, improve electrical performance and support a plug detection capability. The values of the pull up resistor termination device and the ground resistor termination device on the FSI data signal are chosen such that when a memory module is plugged in, a logic level of "1" can be detected. When a memory module is not plugged in, a logic level of "0" can be detected.

BRIEF SUMMARY

In accordance with an aspect of the present invention, a method is provided for retrieving status information from a remote device performed on a host system, wherein the remote device is connected to the host system via a bus comprising at least two signal lines terminated with resistors on the host system side and on the remote device side. The method includes: activating a sensing phase; sensing at least two terminated signal lines during the sensing phase; and determining operating state of the remote device based on the sensing result; wherein at least a first operating state representing a connected and powered remote device is detectable.

According to yet another embodiment of the present invention, a host system is provided comprising a control unit for retrieving status information from a remote device, wherein the remote device is connected to the host system via a bus system comprising at least two signal lines terminated with resistors on the host system side and the remote device side. The control unit senses the at least two terminated signal lines during a sensing phase, and determines operating state of the remote device based on the sensing result, wherein the control unit is able to detect at least a first operating state representing a connected and powered remote device.

In a further aspect, a computer program product is provided for retrieving status information from a remote device performed on a host system, wherein the remote device is connected to the host system via a bus system comprising at least two signal lines terminated with resistors on the host system side and on the remote device side. The computer program product includes a computer-readable storage medium readable by a processor for storing instructions for execution by the processor for performing a method comprising: activating a sensing phase; sensing the at least two terminated signal lines during the sensing phase; and determining operating state of the remote device based on the sensing result; wherein at least a first operating state representing a connected and powered remote device is detectable.

The above, as well as additional purposes, features, and advantages of the present invention will become apparent in the following detailed written description.

BRIEF DESCRIPTION OF THE SEVERAL VIEWS OF THE DRAWINGS

Embodiments of the present invention, as described in detail below, are shown in the drawings, in which.

DETAILED DESCRIPTION

Figure 1:
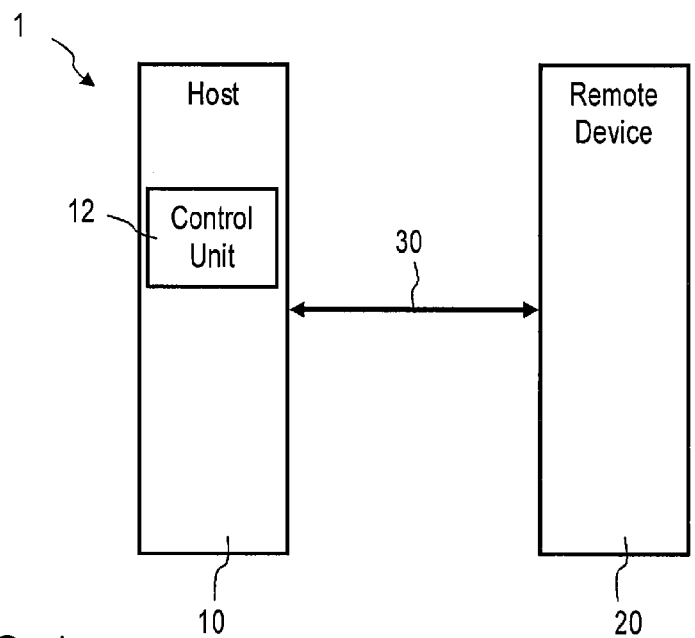
FIG. 1 is a schematic block diagram of an exemplary communication environment showing a remote device connected to a host system via a bus system.

The technical problem underlying the present invention is to provide a method for retrieving status information from a remote device and a host system retrieving status information from a remote device, which are able to distinguish between different scenarios based on a status of the remote device and to solve the above mentioned shortcomings and pain points of prior art retrieving of status information from a remote device performed on a host system.

According to the present invention this problem is solved in certain aspects by providing a method for retrieving status information from a remote device having the features of claim 1, a host system retrieving status information from a remote device having the features of claim 8, and a computer program product for retrieving status information from a remote device performed on a host system having the features of claim 14. Advantageous embodiments of the present invention are mentioned in the sub claims.

Accordingly, in an embodiment of the present invention, a method for retrieving status information from a remote device performed on a host system, comprises activating a sensing phase; sensing the at least two terminated signal lines during the sensing phase; and determining operating state of the remote device based on the sensing result; wherein at least a first operating state representing a connected and powered remote device is detectable. The remote device is connected to the host system via a bus system comprising at least two signal lines terminated with resistors on host system side and on remote device side.

In further embodiments of the present invention, the signal lines comprise at least one clock line and at least one data line.

In further embodiments of the present invention, the termination resistors comprise a pull-up resistor on host system side and a pull-down resistor on remote device side or a pull-down resistor on host system side and a pull-up resistor on remote device side or a pull-up resistor on host system side and a switchable resistor on remote device side or a pull-down resistor on host system side and a switchable resistor on remote device side.

In further embodiments of the present invention, the signal lines are terminated identically and the first operating state is detected when both signal lines are pulled to the same level during the sensing phase.

In further embodiments of the present invention, the signal lines are inverse terminated and four different operating states are detectable depending on a used termination resistor configuration.

In further embodiments of the present invention, a first signal line is terminated with the pull-up resistor on host system side and with the switchable resistors on remote device side, and a second signal line is terminated with a pull-down resistor on host system side and with the pull-up resistors on remote device side, and wherein four different operating states are detectable.

In further embodiments of the present invention, the first operating state represents a connected and powered remote device or a connected, powered and initialized remote device, and a second operating state represents an unplugged remote device, and a third operating state represents a plugged but not powered remote device, and a fourth operating state represents an invalid state or a connected, powered, and not initialized remote device.

In another embodiment of the present invention, a host system comprises a control unit for retrieving status information from a remote device, wherein the remote device is connected to the host system via a bus system comprising at least two signal lines terminated with resistors on host system side and on remote device side, wherein the control unit senses the at least two terminated signal lines during a sensing phase; and determines operating state of the remote device based on the sensing result; wherein the control unit is able to detect at least a first operating state representing a connected and powered remote device.

In further embodiments of the present invention, the bus system comprises a low-pin count bus; and the signal lines comprise at least one clock line and at least one data line.

In further embodiments of the present invention, the termination resistors comprise a pull-up resistor on host system side and a pull-down resistor on remote device side or a pull-down resistor on host system side and a pull-up resistor on remote device side or a pull-up resistor on host system side and a switchable resistor on remote device side or a pull-down resistor on host system side and a switchable resistor on remote device side.

In further embodiments of the present invention, the signal lines are terminated identically and the control unit detects the first operating state when both signal lines are pulled to the same level during the sensing phase.

In further embodiments of the present invention, a first signal line is terminated with the pull-up resistor on host system side and with the pull-down resistor on remote device side, wherein a second signal line is terminated with the pull-down resistor on host system side and with the pull-up resistors on remote device side, wherein the control unit detects a first operating state when during the sensing phase the first signal line is pulled to a low level and the second signal line is pulled to a high level, wherein the control unit detects a second operating state representing a unplugged remote device when during the sensing phase the first signal line is pulled to a high level and the second signal line is pulled to a low level, wherein the control unit detects a third operating state representing a plugged but not powered remote device when during the sensing phase the first signal line is pulled to a low level and the second signal line is pulled also to a low level, and wherein the control unit detects a fourth operating state representing an invalid state when during the sensing phase the first signal line is pulled to a high level and the second signal line is pulled also to a high level.

In further embodiments of the present invention, a first signal line is terminated with the pull-up resistor on host system side and with the switchable resistors on remote device side, wherein the switchable resistor is connected to the low level, when the remote device is not powered and is connected to the high level, when the remote device is powered and ready for operation; wherein a second signal line is terminated with a pull-down resistor on host system side and with the pull-up resistors on remote device side, wherein the control unit detects a first operating state representing a plugged, powered, and initialized remote device when during the sensing phase the first signal line is pulled to a high level and the second signal line is pulled also to a high level, wherein the control unit detects a second operating state representing a unplugged remote device when during the sensing phase the first signal line is pulled to a high level and the second signal line is pulled to a low level, wherein the control unit detects a third operating status representing a plugged but not powered remote device when during said sensing phase the first signal line is pulled to a low level and the second signal line is pulled also to a low level, and wherein the control unit detects a fourth operating state representing a plugged, powered, and not initialized remote device when during the sensing phase the first signal line is pulled to a low level and the second signal line is pulled to a high level.

In another embodiment of the present invention, a data processing program for execution in a data processing system comprises software code portions for performing a method for retrieving status information from a remote device when the program is run on the data processing system.

In yet another embodiment of the present invention, a computer program product stored on a computer-usable medium, comprises computer-readable program means for causing a computer to perform a method for retrieving status information from a remote device when the program is run on the computer.

All in all, embodiments of the present invention address the problem of retrieving status information from a connected remote device by a host system via a low-pin count bus comprising at least two signal lines.

The advantages of the present invention are achieved by adding additional termination resistors to terminate at least two signal lines on remote device side and on host side. By adding additional resistors to the bus signal lines, a dedicated sense line is no longer required in order to detect presence of a peripheral device. As a result less bus lines reduce complexity and pin count of the system, resulting in lower overall costs.

Figure 2:
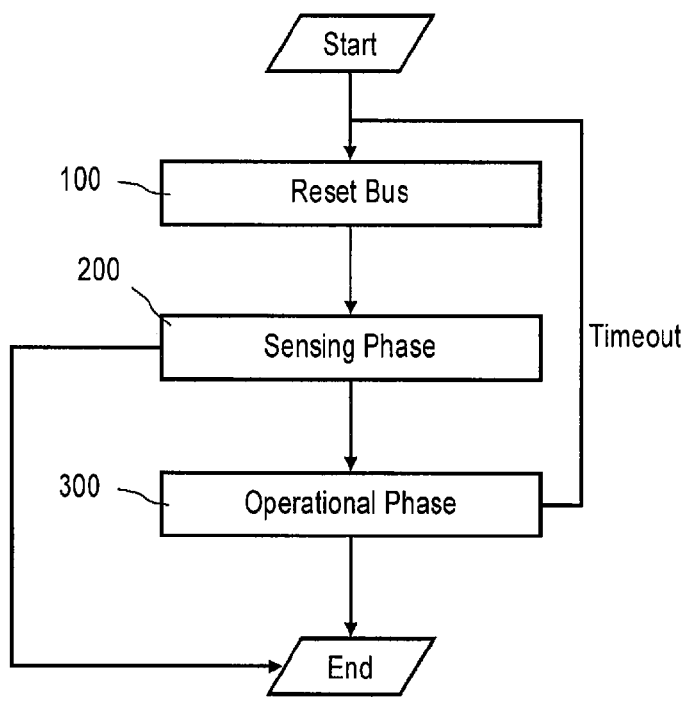
FIG. 2 is a schematic flow diagram of a method for operating the bus system shown in FIG. 1 including a method for retrieving status information from a remote device performed on a host, in accordance with an embodiment of the present invention.
Figure 3:
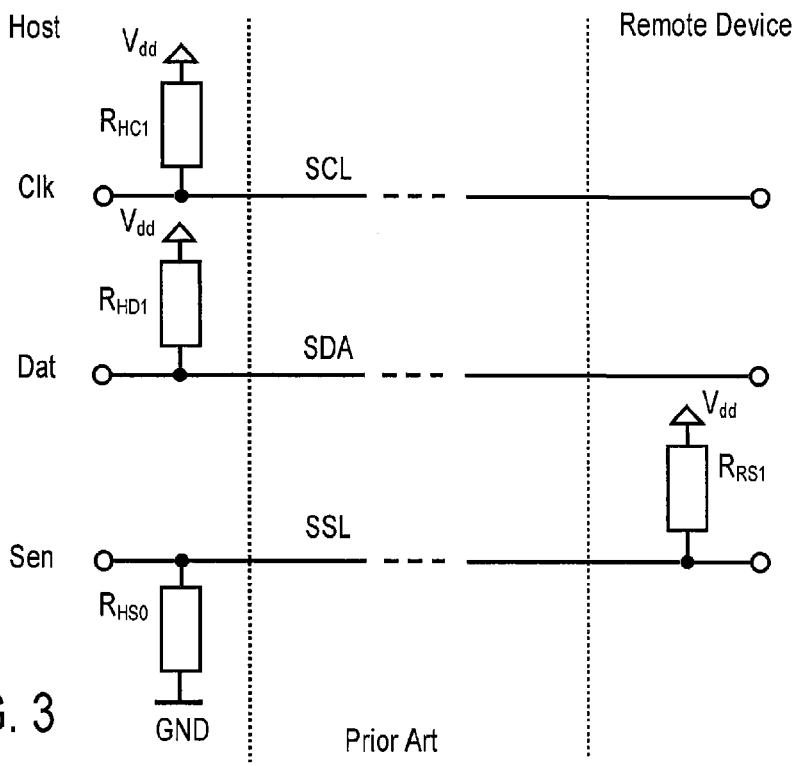
FIG. 3 is a schematic circuit diagram of the bus system of the communication environment shown in FIG. 1, in accordance with a first embodiment of the prior art.
Figure 4:
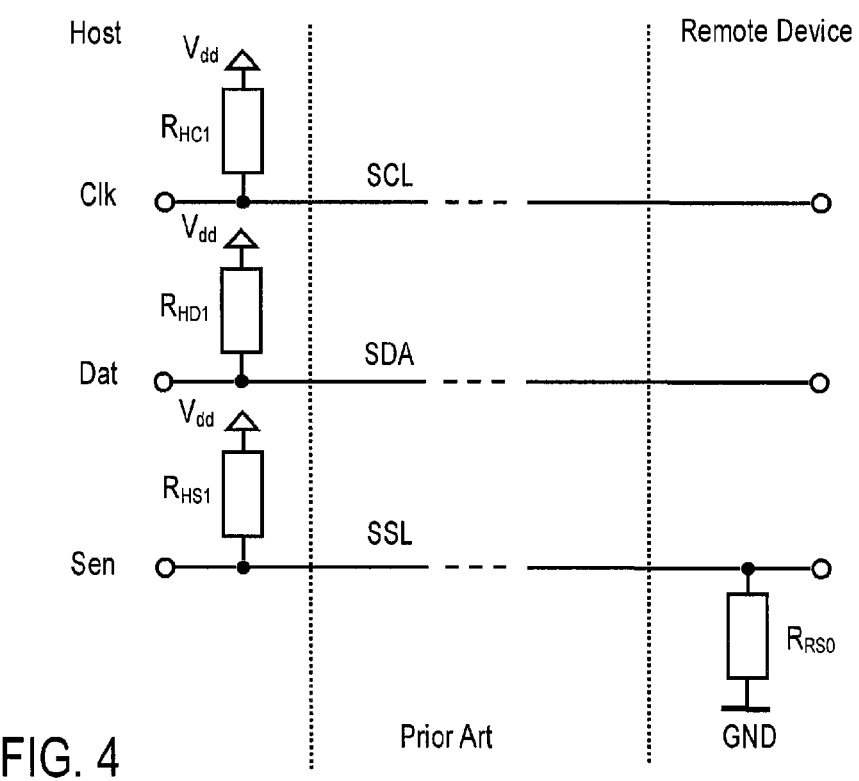
FIG. 4 is a schematic circuit diagram of the bus system of the communication environment shown in FIG. 1, in accordance with a second embodiment of the prior art.
Figure 5:
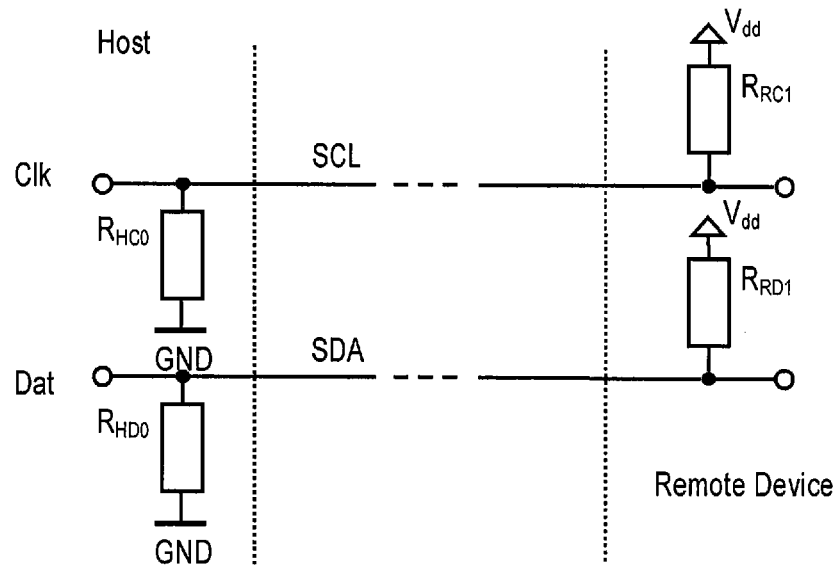
FIG. 5 is a schematic circuit diagram of the bus system of the communication environment shown in FIG. 1, in accordance with a first embodiment of the present invention.
Figure 6:
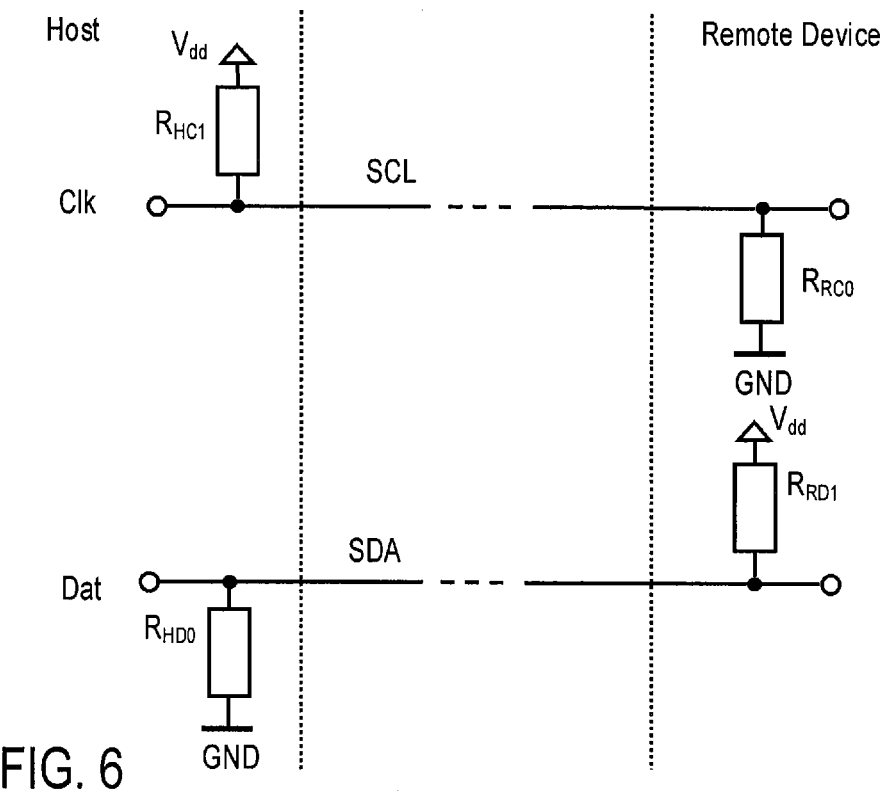
FIG. 6 is a schematic circuit diagram of the bus system of the communication environment shown in FIG. 1, in accordance with a second embodiment of the present invention.
Figure 7:
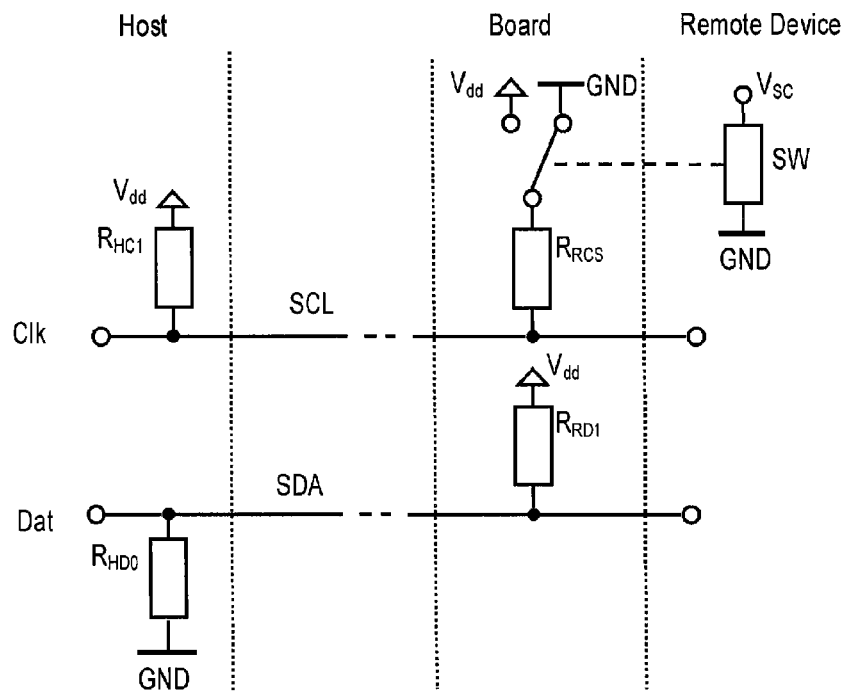
FIG. 7 is a schematic circuit diagram of the bus system of the communication environment shown in FIG. 1, in accordance with a third embodiment of the present invention.
Figure 8:
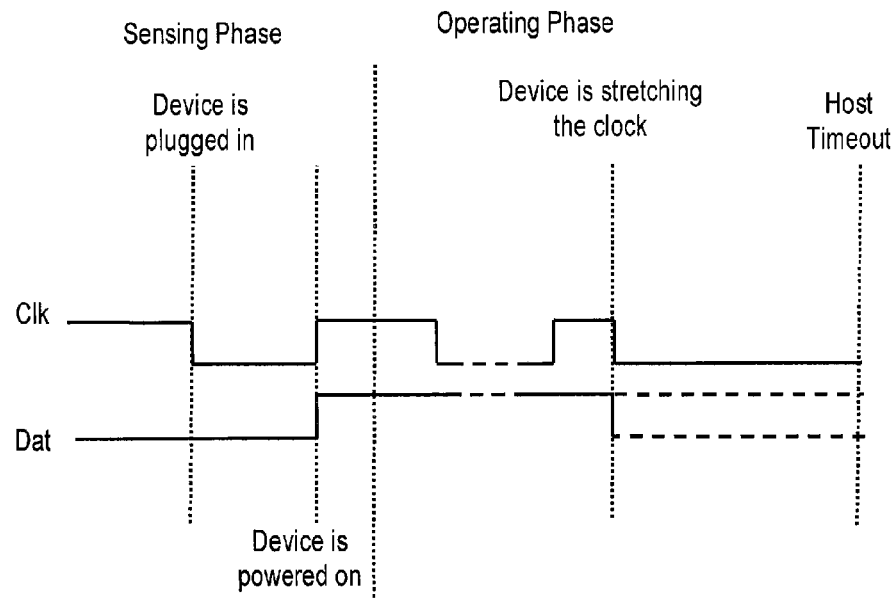
FIG. 8 is a diagram showing waveforms on signal lines of the bus system shown in FIG. 6.
Figure 9:
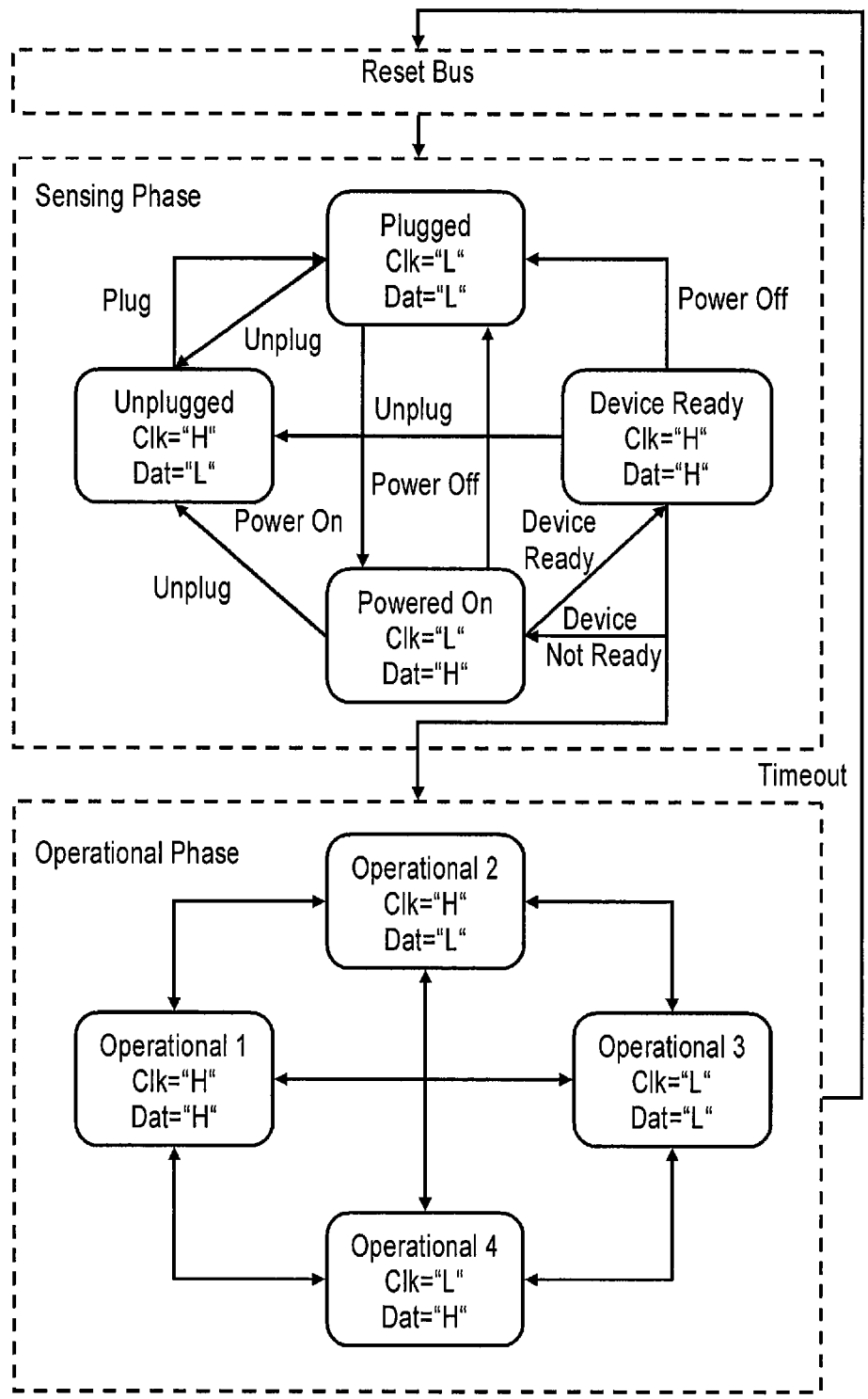
FIG. 9 is a diagram showing a finite state machine on the host system analyzing signals on signal lines of the bus system shown in FIG. 7, in accordance with an embodiment of the present invention.

FIG. 1 shows an exemplary communication environment 1 showing a remote device 20 connected to a host system 10 via a bus system 30; FIG. 2 shows a method for operating the bus system 30 shown in FIG. 1 including a method for retrieving status information from a remote device 20 performed on a host 10, in accordance with an embodiment of the present invention, FIG. 5 shows the bus system 30 of the communication environment 1 shown in FIG. 1, in accordance with a first embodiment of the present invention; FIG. 6 shows the bus system 30 of the communication environment 1 shown in FIG. 1, in accordance with a second embodiment of the present invention; FIG. 7 shows the bus system 30 of the communication environment 1 shown in FIG. 1, in accordance with a third embodiment of the present invention; and FIG. 8 shows waveforms CLK, Dat on signal lines SCL, SDA of the bus system 30 shown in FIG. 6.

Referring to FIG. 1, in the shown embodiment, the host system 10 comprises a control unit 12 for retrieving status information from the remote device 20.

Referring to FIG. 2, the shown embodiment of the present invention employs a method of operating a bus system 30 comprising a bus reset procedure 100, a sensing phase 200, including the method for retrieving status information from a remote device 20, and an operational phase 300.

Referring to FIGS. 1, 2 and 5 to 7, the bus system 30 comprises at least two signal lines SCL, SDA terminated with resistors $R_{HC1}$, $R_{HC0}$, $R_{HD1}$, $R_{HD0}$, $R_{RC1}$, $R_{RC0}$, $R_{RD1}$, $R_{RCS}$ on host system side and on remote device side, wherein the control unit 12 senses the at least two terminated signal lines SCL, SDA during a sensing phase 200, and determines an operating state of the remote device 20 based on the sensing result. The control unit 12 is able to detect at least a first operating state representing a connected and powered remote device 20, without using a dedicated sense line. In the shown embodiments the bus system 30 comprises a low-pin count bus, an I²C for example; and the signal lines comprise a clock line SCL and a data line SDA.

Referring to FIG. 5, the termination resistors of a first embodiment of the bus system 30 comprise pull-down resistors $R_{HC0}$, $R_{HD0}$ on host system side, and pull-up resistor $R_{RC1}$, $R_{RD1}$ on remote device side. Therefore, the clock line SCL is pulled low by a first pull-down resistor $R_{HC0}$ on host system side, and pulled high by a first pull-up resistor $R_{RC1}$ on remote device side, if the remote device 20 is connected. The data line SDA is pulled low by a second pull-down resistor $R_{HD0}$ on host system side, and pulled high by a second pull-up resistor $R_{RD1}$ on remote device side, if the remote device 20 is connected. In an alternative embodiment, which is not shown, the termination resistors of the bus system 30 comprise pull-up resistors on host system side, and pull-down resistor on remote device side. Therefore, the clock line SCL is pulled high by a third pull-up resistor on host system side, and pulled low by a third pull-down resistor on remote device side, if the remote device 20 is connected. The data line SDA is pulled high by a fourth pull-up resistor on host system side, and pulled low by a fourth pull-down resistor on remote device side, if the remote device 20 is connected.

The shown first embodiment of the bus system 30 improves the state of the art approach, because the extra sense line is no longer required. The control unit 12 of the host system 10 examines the signal lines SCL, SDA of the low-pin count bus 30 during the sensing phase 200. In case of scenario c) and d) in which the bus system 30 between the host system 10 and the remote device 20 is connected and the remote device 20 is supplied with power, both signal lines SCL, SDA are pulled high by the pull-up resistors $R_{RC1}$, $R_{RD1}$ on the remote device side and show a high level "1". The control unit 12 can distinguish between scenarios c) and d) based on the decision, whether the remote device 20 is responding to requests sent by the host system 10 or not. If the connected remote device 20 is responding, the control unit 12 identifies scenario d). If the connected remote device 20 is not responding, the control device 20 identifies scenario c). If scenario a) in which the bus system 30 between the host system 10 and the remote device 20 is disconnected, or scenario b) is true in which the bus system 30 between the host system 10 and the remote device 20 is connected, but the remote device 20 is not supplied with power, the two signal lines SCL, SDA of the low-pin count bus 30 are pulled low by the pull-down resistors $R_{HCO}$, $R_{HDO}$ on the host system side and show a low level "0". The control unit 12 is not able to distinguish between scenarios a) and b) but is able to identify scenarios c) and d) as described above. The termination resistors $R_{RC1}$, $R_{RD1}$ on the remote device side should be dimensioned in the range of 4.7 kΩ, whereas the termination resistors $R_{HC0}$, $R_{HD0}$ on the host system side should be dimensioned significantly larger in the range of 100 kΩ, for example. The sensing phase of the not shown alternative embodiment is performed on an analog way, wherein different signal levels are used to identify the scenarios a) to d).

Referring to FIGS. 6 and 8, the termination resistors comprise a pull-down resistor $R_{HD0}$ and a pull-up resistor $R_{HC1}$ on host system side, and a pull-up resistor $R_{RD1}$ and a pull-down resistor $R_{RC0}$ on remote device side. Therefore the clock line SCL is pulled high by a third pull-up resistor $R_{HC1}$ on host system side, and pulled low by a third pull-down resistor $R_{RC0}$ on remote device side, if the remote device 20 is connected. The data line SDA is pulled low by the second pull-down resistor $R_{HD0}$ on host system side, and pulled high by the second pull-up resistor $R_{RD1}$ on remote device side, if the remote device 20 is connected. In an alternative embodiment, which is not shown, the termination resistors comprise a pull-down resistor $R_{HC0}$ and a pull-up resistor $R_{HD1}$ on host system side, and a pull-up resistor $R_{RC1}$ and a pull-down resistor $R_{RD0}$ on remote device side. Therefore the clock line SCL is pulled low by the first pull-down resistor $R_{HC0}$ on host system side, and pulled high by the first pull-up resistor $R_{RC1}$ on remote device side, if the remote device 20 is connected. The data line SDA is pulled high by a fourth pull-up resistor $R_{HD1}$ on host system side, and pulled low by a fourth pull-down resistor $R_{RD0}$ on remote device side, if the remote device 20 is connected.

The two signal lines SCL, SDA used for the low pin count bus 30 are terminated on the host system side with two high-impedance resistors $R_{HC1}$, $R_{HD0}$ in the range of 100 kΩ, and on the remote device side with two relatively low-impedance resistors $R_{RC0}$, $R_{RD1}$ in the range of 4.7 kΩ.

The shown second embodiment of the bus system 30 improves the first embodiment of the bus system 30, because the control unit 12 is able to distinguish between scenarios a) and b). The second embodiment of the bus system 30 is not working within an I²C environment. When no remote device 20 is connected to the bus system 30, the high-impedance pull-up resistor $R_{HC1}$ on the host system side drives the signal value on the clock line SCL to the high level "1", and the high-impedance pull-down resistor $R_{HD0}$ on the host system side drives the signal value on the data line SDA to the low level "0". When a remote device 20 is connected, then the pull-down resistor $R_{RC0}$ on the remote device side pulls the clock line SCL to the low level "0". When the remote device 20 is supplied with power, the pull-up resistor $R_{RD1}$ on the remote device side pulls the data line SDA to the high level "1". At this point, the host system 10 can assume that the remote device 20 is plugged and supplied with power and thus is operational. The host can now enter the operational phase 300.

Thus, during the sensing phase 200, the control unit 12 of the host system 10 can distinguish the before mentioned scenarios as follows:

Scenario a): The low pin count bus signals show a high level "1" on the clock line SCL and a low level "0" on the data line SDA.

Scenario b): The low pin count bus signals show a low level "0" on both the clock line SCL and the data line SDA.

Scenario c): The low pin count bus signals show a low level "0" on the clock line SCL and a high level "1" on the data line SDA.

Scenario d): The low pin count bus signals show a low level "0" on the clock line SCL and a high level "1" on the data line SDA.

The control unit 12 can distinguish between scenarios c) and d) based on the decision, whether the remote device 20 is responding to requests sent by the host system 10 or not. If the connected remote device 20 is responding, the control unit 12 identifies scenario d). If the connected remote device 20 is not responding, the control device 20 identifies scenario c). The sensing phase of the not shown alternative embodiment is performed on an analog way, wherein different signal levels are used to identify the scenarios a) to d).

Still referring to FIGS. 6 and 8, in the operational phase 300, the control unit 12 may not be able to determine that a remote device 20 has been unplugged or lost its power. This is true if the bus protocol used on the low pin count bus 30 allows for what is known as "clock stretching". In order to distinguish between clock stretching and the loss of power on the remote side, the control unit 12 enforces a timeout that determines how long the remote device 20 may stretch the clock. If the timeout is exceeded, the control unit 12 on the host system 10 re-enters the sensing phase 200. The same logic applies to any other bus errors: If the control unit 12 on the host system 10 encounters an error on the bus 30, it falls back to the sensing phase 200 where it is able to determine whether the error has been caused by loss of power on the remote device 20 or the remote device 200 has been unplugged.

Since the second embodiment of the present invention is not working within an I²C environment, a third embodiment of the present invention was developed. Referring to FIG. 7, in the shown third embodiment of the present invention, the termination resistors comprise a pull-down resistor $R_{RD0}$ and a pull-up resistor $R_{HC1}$ on host system side, and a pull-up resistor $R_{RD1}$ and a switchable resistor $R_{RCS}$ on remote device side. Therefore the clock line SCL is pulled high by the third pull-up resistor $R_{HC1}$ on host system side, and pulled low by the switchable resistor $R_{RCS}$ on remote device side, if the remote device 20 is connected and a corresponding switch SW connects the switchable resistor $R_{RCS}$ with ground potential. Alternatively the clock line SCL is pulled high by the third pull-up resistor $R_{HC1}$ on host system side, and pulled high by the switchable resistor $R_{RCS}$ on remote device side, if the remote device 20 is connected and the corresponding switch SW connects the switchable resistor $R_{RCS}$ with supply voltage potential $V_{dd}$. The data line SDA is pulled low by the second pull-down resistor $R_{HD0}$ on host system side, and pulled high by the second pull-up resistor $R_{RD1}$ on remote device side, if the remote device 20 is connected. In an alternative embodiment, which is not shown, the termination resistors comprise a pull-down resistor and a pull-up resistor on host system side, and a pull-up resistor and a switchable resistor on remote device side. Therefore the clock line SCL is pulled low by the first pull-down resistor on host system side, and pulled high by the first pull-up resistor on remote device side, if the remote device 20 is connected. The data line SDA is pulled high by a fourth pull-up resistor on host system side, and pulled low by the switchable resistor on remote device side, if the remote device 20 is connected and a corresponding switch SW connects the switchable resistor with ground potential. Alternatively the data line SDA is pulled high by the fourth pull-up resistor on host system side, and pulled high by the switchable resistor on remote device side, if the remote device 20 is connected and the corresponding switch SW connects the switchable resistor $R_{RCS}$ with supply voltage potential. The third embodiment of the bus system 30 is also working within an I²C environment.

In the shown third embodiment of the bus system 30 the control unit 12 is also able to distinguish between scenarios a) and b). The data line SDA is again terminated with a high-impedance pull-down resistor $R_{HD0}$ in the range of 100 kΩ on the host side, and with a relatively low-impedance pull-up resistor $R_{RD1}$ in the range of 4.7 kΩ on the remote device side. The clock line SCL is terminated with a high-impedance pull-up resistor $R_{HC1}$ in the range of 100 kΩ on the host system side, too. On the remote device side, an applicable logic, represented by the switch SW is added. That logic SW is responsible for connecting the clock line SCL to a relatively low-impedance pull-down resistor $R_{RCS}$ in the range of 4.7 kΩ as long as the remote device 20 is disconnected from its power supply. Dependent on a further condition like the remote device 20 is supplied with power or the remote device 20 is ready to operate indicated by a corresponding control signal $V_{sc}$, the logic SW connects the clock line SCL to a relatively low-impedance pull-up resistor $R_{RCS}$ in the range of 4.7 kΩ, disconnecting the pull-down resistor at the same time. The exact implementation of that logic is outside the scope of this invention and could range from a simple switch to a complex microcontroller solution.

Thus, during the sensing phase 200, the control unit 12 of the host system 10 can distinguish the before mentioned scenarios a) to d) as follows, if the control signal $V_{SC}$ is represented by the supply voltage $V_{dd}$:

Scenario a): The low pin count bus signals show a high level "1" on the clock line SCL and a low level "0" on the data line SDA.

Scenario b): The low pin count bus signals show a low level "0" on both the clock line SCL and the data line SDA.

Scenario c): The low pin count bus signals show a high level "1" on the clock line SCL and a high level "1" on the data line SDA.

Scenario d): The low pin count bus signals show a high level "1" on the clock line SCL and a high level "1" on the data line SDA.

The control unit 12 can distinguish between scenarios c) and d) based on the decision, whether the remote device 20 is responding to requests sent by the host system 10 or not. If the connected remote device 20 is responding, the control unit 12 identifies scenario d). If the connected remote device 20 is not responding, the control device 20 identifies scenario c).

Thus, during the sensing phase 200, the control unit 12 of the host system 10 can distinguish the different scenarios a), b), c\*) and d\*), if the control signal $V_{SC}$ is representing a device ready to operate condition or a device initialized condition output by a controlling device of the remote device 20. The different scenarios comprise the following scenarios:

Scenario a): The bus system 30 between the host system 10 and the remote device 20 is disconnected.

Scenario b): The bus system 30 between the host system 10 and the remote device 20 is connected, but the remote device 20 is not supplied with power.

Scenario c\*): The bus system 30 between the host system 10 and the remote device 20 is connected, the remote device 20 is supplied with power but not ready to operate or not initialized.

Scenario d\*): The bus system 30 between the host system 10 and the remote device 20 is connected; the remote device 20 is supplied with power and ready to operate or initialized.

The control unit 12 identifies scenario a) if the low pin count bus signals show a high level "1" on the clock line SCL and a low level "0" on the data line SDA, scenario b) if the low pin count bus signals show a low level "0" on both the clock line SCL and the data line SDA, scenario c\*) if the low pin count bus signals show a low level "0" on the clock line SCL and a high level "1" on the data line SDA, and scenario d\*) if the low pin count bus signals show a high level "1" on the clock line SCL and a high level "1" on the data line SDA. The sensing phase of the not shown alternative embodiment is performed on an analog way, wherein different signal levels are used to identify the scenarios a), b), c\*) and d\*).

Referring to FIGS. 2, 7, 9, 10 and 11 the method for operating the bus system 30 shown in FIG. 1 is described in detail using the example of an I²C bus system.

The I²C Specification demands that I²C-compatible devices reset their internal state upon receipt of a START condition. An I²C START condition ('S') is the High-to-Low transition of the data line SDA while the clock line SCL is high.

I²C allows for another way of signaling a START condition, using a so-called START byte. This works as follows:

I²C master, represented by the host system 10 sends a regular START condition ('S'). The I²C master 10 sends a START byte sequence ('00000001'). The I²C devices, represented by the remote device 20 must not acknowledge the address. The I²C master 10 sends a repeated START condition. Regular bus operation presumes.

The purpose of a bus reset 100 is to force remote devices 20 off the bus 30, i.e. make them stop driving the bus lines SDA, SCL. The bus reset procedure 100 can be implemented by signaling a START condition, then sending seven pulses on the clock line SCL while the data line SDA is pulled low, then sending a single pulse on the clock line SCL with the data line SDA at the high state ('S00000001'). This requires all I²C devices 20 to reset their internal logic, causing them to release the bus signals. Hence, the master 10 is the only driver of the bus lines SCL, SDA after the bus reset procedure 100 has been performed.

As discussed above, the bus master 10 has full control of the bus 30 after a bus reset procedure 100. It can therefore enter the sensing phase 200 right after a bus reset 100. During the sensing phase 200, neither the bus master 10 nor any of the remote devices 20 drive the bus lines SCL, SDA, so the signal levels are solely determined by the termination resistors.

Once the host system 10 has detected that at least one remote device 20 is connected, supplied with power and ready to operate, it enters the operational phase 300. During the operational phase 300, the bus signals Clk, Dat may vary depending on the state of bus operation.

Looking at the operational phase 300 using the example of I²C bus 30, there are a number of facts to consider, given by the I²C specification:

While in operational mode, the bus 30 is controlled by the bus master 10. In general, the bus master 10 drives the bus clock Clk on the clock line SCL. However, I²C remote devices 20 may "stretch the clock", i.e. pull the clock line SCL low to delay the next cycle of the clock signal Clk. I²C requires that receivers send an acknowledge for the reception of data. The role of the receiver changes, depending on the data transfer direction: The receiver is the remote device 20 when the host system 10 is sending data to the remote device 20. If the host system 10 is reading data from the remote device 20, then the host system 10 acts as the receiver. I²C remote devices 20 can only actively drive a signal to a low level '0'. Signaling a high level '1' is performed by releasing the signal line causing the signal line to go to the high level '1' because of the termination resistors.

Of course, errors can occur during bus operation. These errors may occur and can be handled by the embodiments of the present invention. A first possible error is, for example, a remote device 20 dies and stops participating in the bus operation by releasing the bus lines SCL, SDA. This causes the bus lines SCL, SDA to assume that the clock line SCL and the data line SDA are both on the high level '1' as soon as the host system 10 stops driving the bus 30. A second possible error is, for example, a remote device 20 breaks and no longer participates in the bus operation, but continues to drive the bus lines SCL, SDA. This is commonly known as a "hanging device". There are four possibilities in this scenario:

2a) The remote device 20 drives both signal lines SCL and SDA to the high level '1'. This does not need special consideration because it's the same situation as the first error.
2b) The remote device 20 drives the clock line SCL to the low level '0' and the data line SDA to the high level '1'.
2c) The remote device 20 drives both signal lines SCL and SDA to the low level '0'.
2d) The remote device 20 drives the clock line SCL to the high level '1' and the data line SDA to a low level '0'.

A third possible error is, for example, a remote device 20 loses power during bus operation. This causes both bus lines SCL and SDA to assume the low level '0' as soon as the host system 10 stops driving the bus 30. A fourth possible error is, for example, a remote device 20 is unplugged during bus operation. This causes the clock line SCL to assume the high level '1' and the data line SDA to assume the low level '0' as soon as the host system 10 stops driving the bus 30.

Unless the remote device 20 is driving the clock line SCL to the low level '0', the host system 10 detects errors because a remote device 20 no longer acknowledges data, i.e. the host system 10 expects, but never receives, an acknowledge bit for data that is transferred. When the host system 10 detects a missing acknowledge, it stops driving the bus 30. In order to isolate the fault, the host system 10 can then reset the bus 30 during the bus reset procedure 100 and then enter the sensing phase 200. Error detection is performed as follows:

If the clock line SCL is on the high level '1' and the data line SDA is on the low level '0' then the remote device 20 was unplugged. If the clock line SCL is on the low level '0' and the data line SDA is on the low level '0' then the remote device 20 lost power. If the clock line SCL is on the low level '0' and the data line SDA is on the high level 'H' the remote device 20 is plugged, supplied with power but not ready to operate. If the clock line SCL is on the high level '1' and the data line SDA is on the high level 'H' then the remote device 20 is broken because it's not responding even though the remote device 20 is plugged, supplied with power and ready to operate.

This procedure addresses errors #1, #2a, #2d, #3 and #4. Errors #2b and #2c can be caught by enforcing a timeout on how long a remote device 20 may continue to drive the clock line SCL to the low level 'L'. The host system 10 monitors and enforces the time out. When the time out is exceeded, the host system 10 resets the bus 30 and enters the sensing phase 200. Error detection is then performed as described above.

Figure 10:
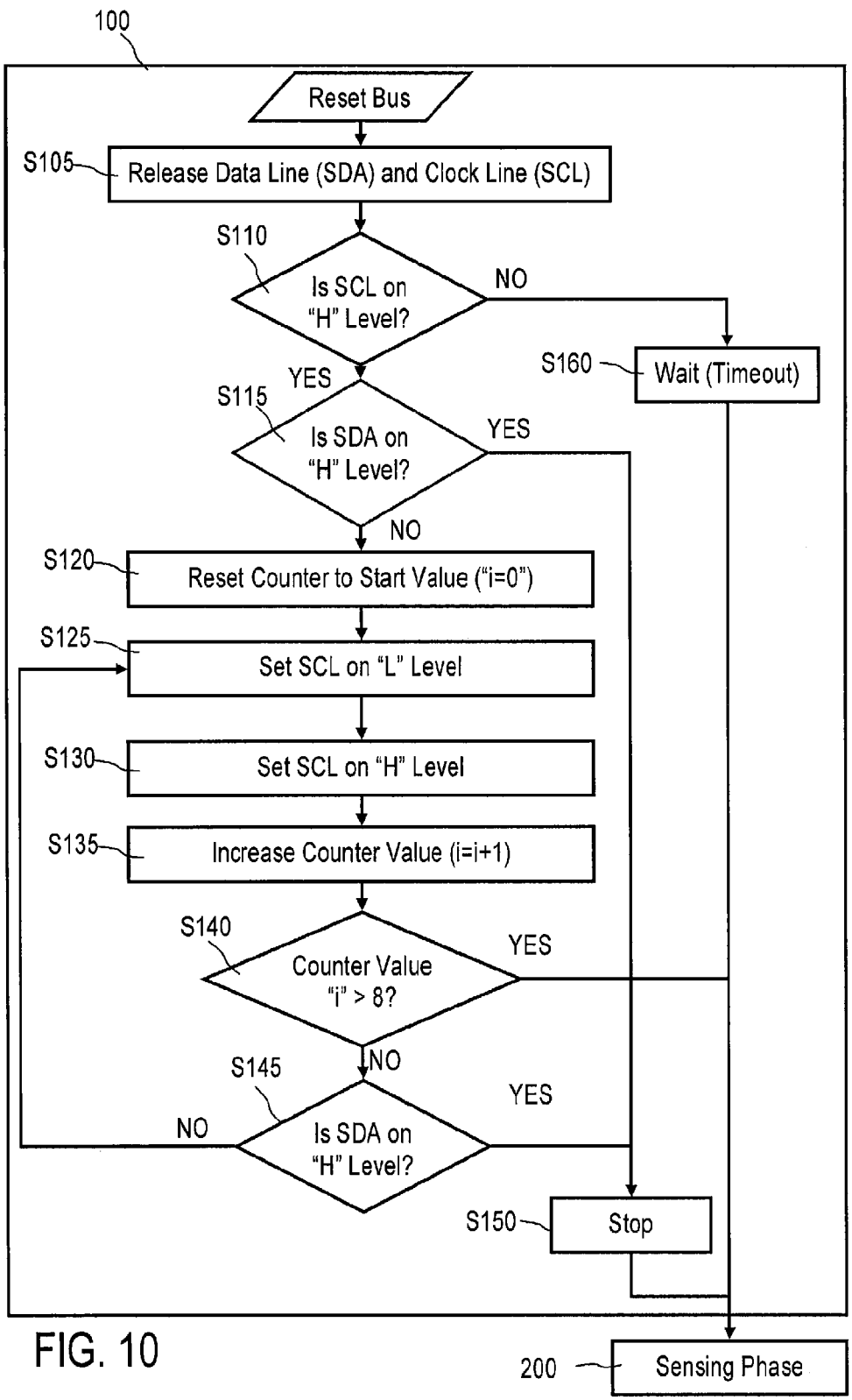
FIG. 10 is a schematic flow diagram of a bus reset procedure of the method for retrieving status information from a remote device performed on a host system shown in FIG. 2, in accordance with an embodiment of the present invention.

Referring to FIG. 10, the bus reset procedure 100 is explained using the example of an I²C Bus.

On an I²C bus system 30, a high signal level '1' indicates that no component is actively driving the signal and the signal level is maintained by external pull-up termination resistors, instead. Consequently, a bus participant can only actively drive a signal low '0', not high '1'. Furthermore, a low signal indicates that a bus participant is actively driving the bus signal.

The method described in FIG. 10 does not work if the slave device represented by the remote device 20 is in the progress of transmitting data to the bus master represented by the host system 10 as the remote device 20 may be actively driving bus signals in such a situation. To handle this scenario, the bus master 10 needs to force the remote device 20 off the bus 30, e.g. by signaling a STOP condition or otherwise making sure that it doesn't drive the bus 30. The method illustrated in FIG. 10 ensures this.

In step S105, the host system 10 releases both lines SDA and SCL and then checks in step S110 if the clock line SCL is at a high state '1'. If it is not, the host system 10 needs to wait in step S160 for a given time period before it can enter the sensing phase 200. The host system 10 waits until either a timeout is exceeded or the clock line SCL goes high "1".

The timeout needs to be chosen in a way that ensures that under normal conditions, no slave device 20 performs clock stretching longer than the timeout. This ensures that if the timeout exceeds, all slave devices 20 will have stopped stalling the clock line SCL. Thus, the host system 10 can enter the sensing phase 200 and assume that the signal levels are maintained by the termination resistors.

If the host system 10 exits the waiting state because the signal on the clock line SCL goes high '1', or if the signal on the clock line SCL is already at the high state '1' when the master 10 enters the reset bus phase 100, the host system 10 looks at the data line SDA in step S115. If the data line SDA is high '1', then the master 10 can signal a STOP condition in step S150, aborting all slave device transfers. After the stop condition in step S150, the master 10 can enter the sensing phase 200. If the data line SDA is at the low state '0', the master 10 is prepared to transfer up to eight bits. Therefore, in step S120 the host system 10 resets a counter to a start value i=0. To transfer a single bit, the host system 10 toggles the clock line SCL from the high to the low level in step S125 and then back to a high level in step S130. This is performed for at most eight cycles or until the data line SDA goes high. Therefore the host system 10 increases the counter value by one (i=i+1) in step S135. In step S140 the host system 10 checks whether the counter value (i) is larger than eight. If not, in step S145 it is checked, if the data line SDA is on the high level '1'. If not, the method is continued with step S125. If the data line SDA is on the high level '1' then the master 10 can signal the STOP condition in step S150, aborting all slave device transfers. After the stop condition in step S150, the master 10 can enter the sensing phase 200. If the counter value (i) is larger than eight the host system 10 enters the sensing phase 200.

This bus reset procedure 100 ensures that all slave devices 20 are forced off the bus 30, i.e. makes sure that only the master 10 is driving bus signals. Because the master 10 is in fact not driving the bus signals, but instead lets the signals float, the bus level is defined by the termination resistors. Hence, once the host system 10 enters the sensing phase 200 after it has performed the described bus reset procedure 100, it can use its knowledge about the termination resistors to perform the sensing phase 200.

In other words, the algorithm described above ensures that both bus signals go high eventually, in which case a remote device 20 is plugged, supplied with power and ready to operate. Or the host system 10 is confident enough that the bus levels it reads are not caused by a remote device 20 driving the bus 30, but rather by the resistors used to terminate the bus signals.

Figure 11:
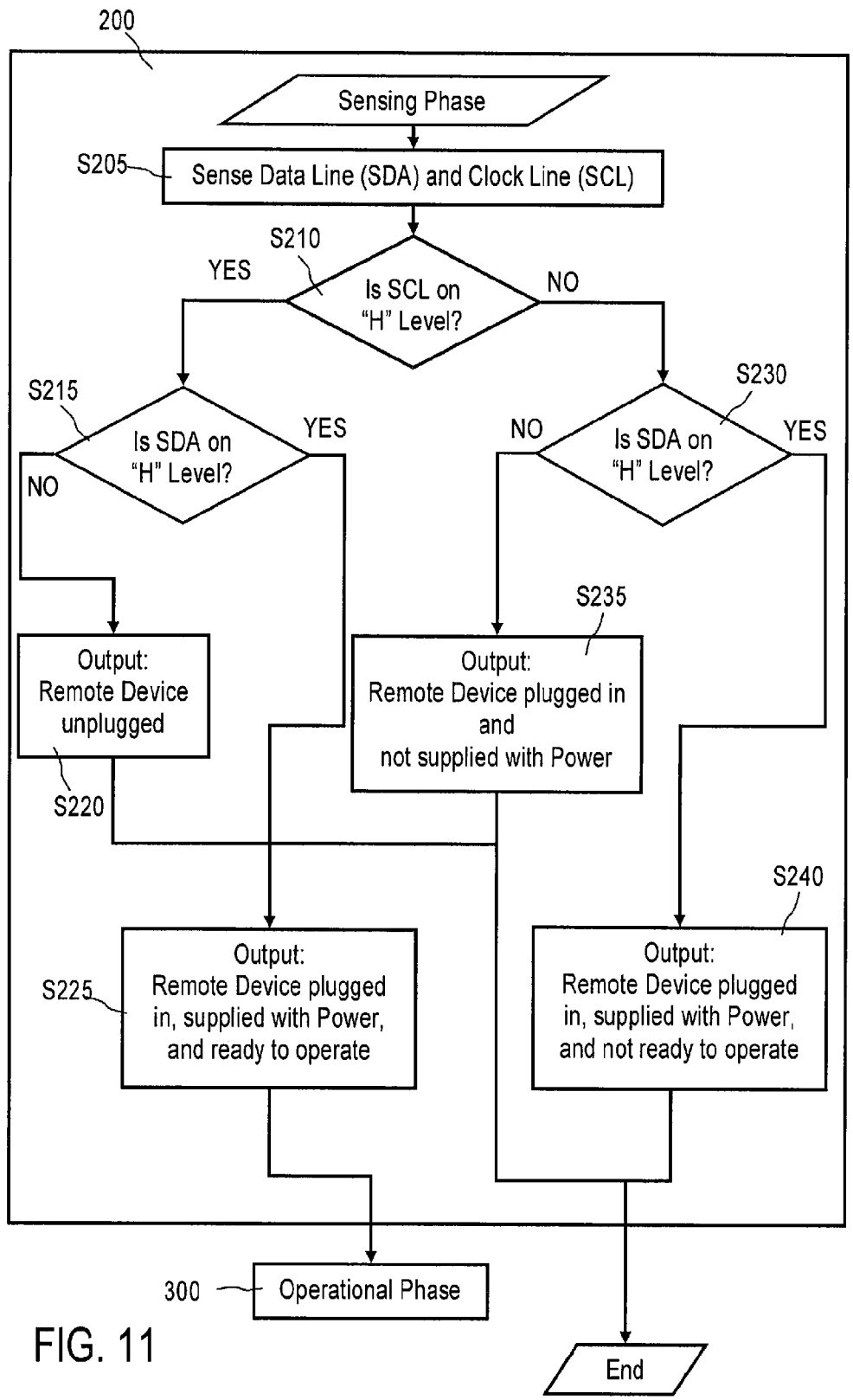
FIG. 11 is a schematic flow diagram of a sensing phase of the method for retrieving status information from a remote device performed on a host system shown in FIG. 2, in accordance with an embodiment of the present invention.

Referring to FIG. 11, during the sensing phase 200, in step S205 the data line SDA and the clock line SCL are sensed by the control unit 12, for example. In step S210 it is checked, whether the clock line SCL is on the high level '1' or not. If the clock line SCL is on the high level '1', it is checked in step S215, if the data line SDA is on the high level '1' too. If not, the error information "remote device unplugged" is output in step S220 and the method is ended. If yes, the information "remote device plugged in, supplied with power and ready to operate" is output in step S225 and the host system 10 enters the operational phase 300. If the clock line SCL is not on the high level '1' in step S210, it is checked if the data line SDA is on the high level '1' in step S230. If not, the error information "remote device plugged in and not supplied with power" is output in step S235 and the method is ended. If yes, the error information "remote device plugged in, supplied with power and not ready to operate" is output in step S240 and the method is ended.

The inventive method for retrieving status information from a remote device can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical disks include compact disc—read only memory (CD-ROM), compact disc—read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method comprising:
retrieving, by a host system, status information from a remote device, wherein said remote device is connected to said host system via a bus system comprising multiple signal lines, at least two signal lines of the multiple signal lines each terminating with a termination resistor on the host system side, and another termination resistor on the remote device side, at least one signal line of the at least two signal lines being a clock line or a data line of the bus system, the retrieving comprising:
activating a sensing phase of the bus system, wherein during the sensing phase, the at least two signal lines are operated as sensing lines;
sensing said at least two signal lines during said sensing phase; and
determining operating state of said remote device based on said sensing result;
wherein at least a first operating state representing a connected and powered remote device is detectable based on the sensing result.

2. The method according to claim 1, wherein said at least two signal lines comprise at least one clock line and at least one data line.

3. The method according to claim 1, wherein said termination resistors comprise a pull-up resistor on the host system side and a pull-down resistor on the remote device side, or a pull-down resistor on the host system side and a pull-up resistor on the remote device side, or a pull-up resistor on the host system side and a switchable resistor on the remote device side or a pull-down resistor on the host system side and a switchable resistor on the remote device side.

4. The method according to claim 3, wherein said at least two signal lines are terminated identically and said first operating state is detected when both of the at least two signal lines are pulled to the same level during said sensing phase.

5. The method according to claim 3, wherein said at least two signal lines are inverse terminated and four different operating states are detectable depending on a used termination resistor configuration.

6. The method according to claim 3, wherein a first signal line of the at least two signal lines is terminated with said pull-up resistor on the host system side and with said switchable resistors on the remote device side, and a second signal line of the at least two signal lines is terminated with a pull-down resistor on the host system side and with said pull-up resistors on the remote device side, and wherein four different operating states are detectable.

7. The method according to claim 5, wherein said first operating state represents a connected and powered remote device or a connected, powered and initialized remote device, and a second operating state represents an unplugged remote device, and a third operating state represents a plugged but not powered remote device, and a fourth operating state represents an invalid state or a connected, powered, and not initialized remote device.

8. A host system comprising:
a control unit for retrieving status information from a remote device, wherein said remote device is connected to said host system via a bus system comprising multiple signal lines, at least two signal lines of the multiple signal lines each terminating with a termination resistor on the host system side, and another termination resistor on the remote device side, at least one signal line of the at least two signal lines being a clock line or a data line of the bus system, wherein said control unit:
activates a sensing phase of the bus system, wherein during the sensing phase, the at least two signal lines are operated as sensing lines;
senses said at least two terminated signal lines during the sensing phase; and
determines operating state of said remote device based on said sensing result;
wherein said control unit is able to detect at least a first operating state representing a connected and powered remote device based on the sending result.

9. The host system according to claim 8, wherein said bus system comprises a low-pin count bus; and said at least two signal lines comprise at least one clock line and at least one data line.

10. The host system according to claim 8, wherein said termination resistors comprise a pull-up resistor on the host system side and a pull-down resistor on the remote device side, or a pull-down resistor on the host system side and a pull-up resistor on the remote device side, or a pull-up resistor on the host system side and a switchable resistor on the remote device side or a pull-down resistor on the host system side and a switchable resistor on the remote device side.

11. The host system according to claim 10, wherein said at least two signal lines are terminated identically and said control unit detects said first operating state when each of the at least two signal lines is pulled to the same level during said sensing phase.

12. The host system according to claim 10, wherein a first signal line of the at least two signal lines is terminated with said pull-up resistor on the host system side and with said pull-down resistor on the remote device side,
wherein a second signal line of the at least two signal lines is terminated with said pull-down resistor on the host system side and with said pull-up resistors on the remote device side,
wherein said control unit detects a first operating state when during said sensing phase said first signal line is pulled to a low level and said second signal line is pulled to a high level,
wherein said control unit detects a second operating state representing a unplugged remote device when during said sensing phase said first signal line is pulled to a high level and said second signal line is pulled to a low level,
wherein said control unit detects a third operating state representing a plugged but not powered remote device when during said sensing phase said first signal line is pulled to a low level and said second signal line is pulled also to a low level, and
wherein said control unit detects a fourth operating state representing an invalid state when during said sensing phase said first signal line is pulled to a high level and said second signal line is pulled also to a high level.

13. The host system according to claim 10, wherein a first signal line of the at least two signal lines is terminated with said pull-up resistor on the host system side and with said switchable resistor on the remote device side, wherein the switchable resistor is connected to said low level, when said remote device is not powered and is connected to said high level, when said remote device is powered and ready for operation;
wherein a second signal line of the at least two signal lines is terminated with the pull-down resistor on the host system side and with said pull-up resistor on the remote device side,
wherein said control unit detects a first operating state representing a plugged, powered, and initialized remote device when during said sensing phase said first signal line is pulled to a high level and said second signal line is pulled also to a high level,
wherein said control unit detects a second operating state representing a unplugged remote device when during said sensing phase said first signal line is pulled to a high level and said second signal line is pulled to a low level,
wherein said control unit detects a third operating status representing a plugged but not powered remote device when during said sensing phase said first signal line is pulled to a low level and said second signal line is pulled also to a low level, and
wherein said control unit detects a fourth operating state representing a plugged, powered, and not initialized remote device when during said sensing phase said first signal line is pulled to a low level and said second signal line is pulled to a high level.

14. A computer program product for retrieving, by a computer, status information from a remote device, wherein said remote device is connected to said host system via a bus system comprising multiple signal lines, at least two signal lines of the multiple signal lines each terminating with a termination resistor on the host system side, and another terminal resistor on the remote device side, at least one signal line of the at least two signal lines being a clock line or a data line of the bus system, the computer program product comprising:

a non-transitory computer-readable storage medium readable by a processor and storing instructions for execution by the processor for performing a method comprising:
- activating a sensing phase of the bus system, wherein during the sensing phase, the at least two signal lines are operated as sensing lines;
- sensing said at least two signal lines during said sensing phase; and
- determining operating state of said remote device based on said sensing result;
- wherein at least a first operating state representing a connected and powered remote device is detectable based on the sensing result.

15. The method of claim 1, wherein the termination resistors of the at least two signal lines at the host system side each have a higher impedance than the respective another termination resistor at the remote device side.

\* \* \* \* \*